UNITED STATES PATENT OFFICE.

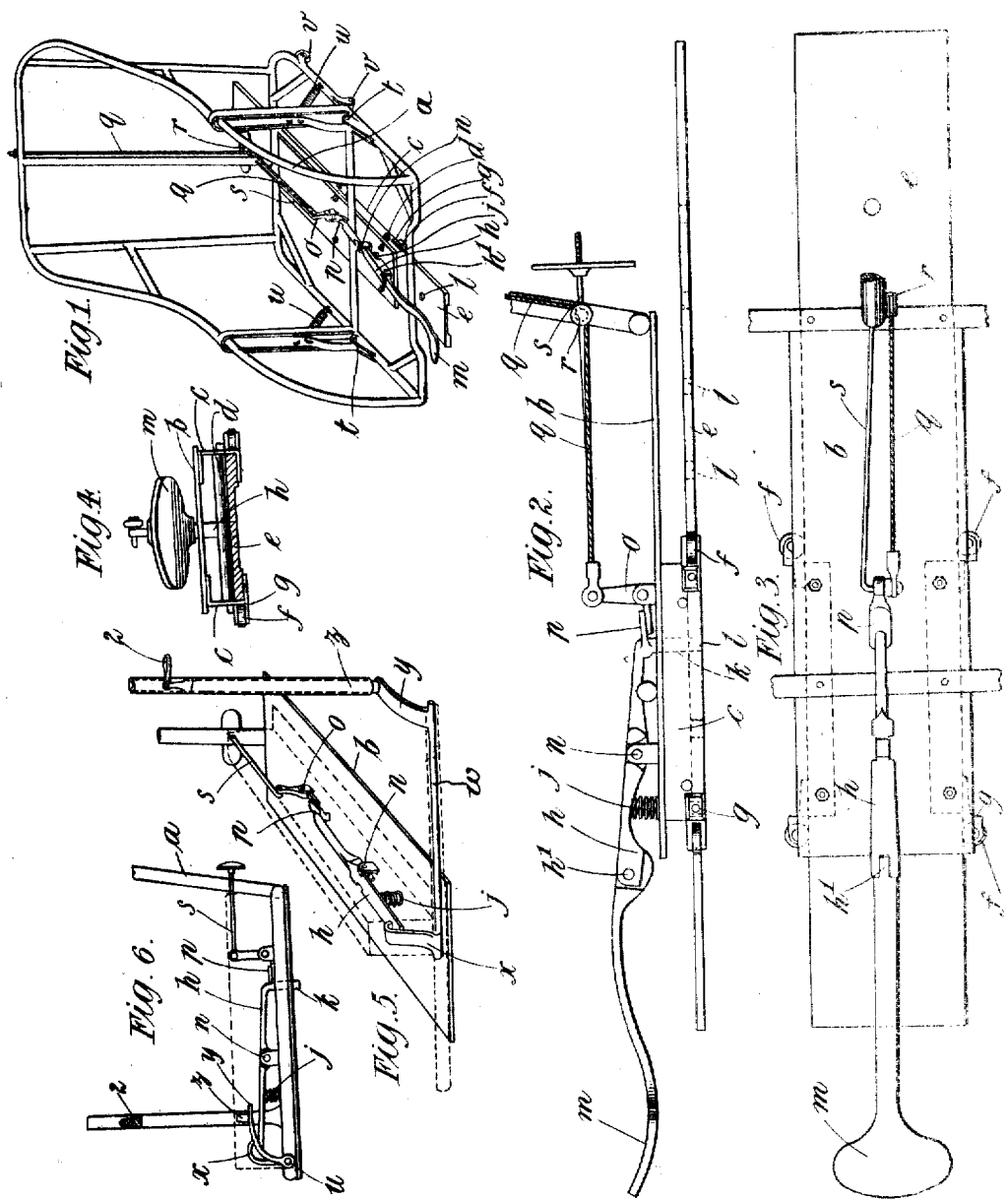

ALBERT E. COLE, OF LONDON, ENGLAND.

SLIDING SEAT FOR MOTOR-CARS AND THE LIKE.

1,383,077.  Specification of Letters Patent.  Patented June 28, 1921.

Application filed November 13, 1919.  Serial No. 337,818.

*To all whom it may concern:*

Be it known that I, ALBERT EDWARD COLE, subject of the King of Great Britain, residing at 235 Hammersmith road, London, W. 6, England, have invented certain new and useful Improvements in Sliding Seats for Motor-Cars and the like, of which the following is a specification.

This invention relates to seats for motor cars and the like and particularly to seats of the armchair type.

The object of this invention is to provide an improved construction of seat whereby the position thereof may be altered.

A seat constructed in accordance with this invention is slidably mounted on a fixed slideway in the car body in such a manner that it can be moved backward and forward and locked in any position by the occupant of the seat when sitting therein.

Mounted on the underside of the base of the seat are one or more rollers which are adapted to bear against a horizontal guideway or base plate fixed in the car body and a locking device is attached to the seat and is adapted to be operated by the occupant while sitting in the seat, to hold said seat in any position along the guideway. A number of small wheels or rollers may also be suitably mounted at the base of the seat to bear against the edges of the guideway to lessen friction and to prevent side play.

The locking device may consist of a spring controlled lever pivotally mounted at the base of the seat, one end of said lever being bent so that it normally engages one of a number of holes formed in the fixed horizontal plate and the other end extending beyond the seat so that it can be operated by the hand or foot of the occupant in order to disengage the other end from the hole in the fixed plate.

The framework of the seat is preferably composed of tubing welded together.

In order to understand the invention fully it will now be described with reference to the accompanying drawings in which Figure 1 is a perspective view of one form of seat constructed in accordance with this invention; Fig. 2 is a side elevation of the locking mechanism; Fig. 3 is a plan thereof; Fig. 4 is a front view thereof; Fig. 5 is a perspective view and Fig. 6 is a side elevation of a modified construction of locking mechanism.

The seat $a$ is of the arm-chair type with rounded back having the framework constructed of light tubing welded together. Fixed to the underside of the base of the frame and disposed midway of the length of the seat is a metal plate $b$. Attached to the underside of this plate $b$ and at each side thereof are two angle pieces $c$ $c$ of L-section so arranged as to act as bearings for the two rollers $d$ $d$ extending transversely across. These rollers $d$ $d$ are adapted to bear against the plate $e$ which is fixed in the car body (not shown) and on which the seat is arranged to slide. Small wheels $f$ $f$ mounted in brackets $g$ $g$ are fitted at each end of the two angle pieces $c$ $c$ and are so arranged as to bear against the edges of the fixed plate $e$ to prevent any side movement and also to lessen friction.

Mounted at $n$ on the plate $b$ is a lever $h$, controlled by the spring $j$, one end $k$ of said lever is bent substantially at right angles so that it normally engages one of the holes $l$ in the plate $e$ while the other end of the lever $h$ extends beyond the front of the seat and is so shaped as at $m$ so that it can be depressed either by the foot or hand in order to disengage the end $k$ from the hole $l$.

The position of the seat may be altered from the back as follows:—Mounted on the plate $b$ is a bell crank $o$, one end of which engages with an extension $p$ formed on the hook $k$ of the lever $h$. The other end of said bell crank has a wire $q$ connected to it which is carried around a pulley $r$ to the top of the back of the seat. By pulling the wire $q$ the bell crank $o$ raises the hook $k$. In addition to the wire $q$ a rod $s$ is connected to the bell crank so that the position of the seat can be adjusted from the bottom.

Figs. 5 and 6 show how the seat may be altered from the side as well as at the back.

Mounted in bearings on the seat framework is a rod $w$ having at one end a bent over arm $x$ adapted to engage with the end of the lever $h$ and at the other end a bent up arm $y$ which is adapted to coact with the rod $z$ slidably mounted in one of the vertical tubular members of the framework.

The said rod $z$ may be moved by the handle 2. When the rod $z$ is forced down on to the arm $y$, the arm $x$ depresses the lever $h$ and raises the hook $k$ out of the hole $l$.

The front portion of the seat may be adapted to assume an upright position when not in use and for the purpose the front portion may be hinged at $t$, springs $u$ $u$ being provided so that the hinged portion is lowered against the action of said springs. The lever $h$ is also hinged at $h'$, so that the front portion $m$ can be turned back.

$v, v$ are wheels-fitted to the base of the frame of the seat and adapted to roll on the floor of the car body.

A suitable housing may be fitted over the locking mechanism to prevent padding or the like from interfering with the working thereof.

What I claim is:—

1. An adjustable seat for vehicles, comprising a seat body having a front portion pivotally connected thereto, a plate attached to the seat body, a runway fixed to the vehicle body on which said plate is slidably mounted, a locking device including a sectional lever mounted on said plate, one of the sections of said lever extending forward over the front portion of the seat, and means for pivotally connecting said sections of the lever, whereby the front portion of the seat and said extended section may be moved to folded position when the seat is unoccupied.

2. An adjustable seat for vehicles, comprising a seat body having a front portion pivotally connected thereto, a plate attached to the base of the seat body, a locking device including a spring-pressed lever pivotally mounted on said plate, a runway including a plate fixed to the car body having a series of apertures formed therein, anti-friction rollers mounted on the plate attached to the seat-base adapted to engage said runway, said lever consisting of a section having one end bent downwardly to engage any one of said apertures, and an operating part pivotally connected to the other end of said section extending forwardly beyond the front portion of said seat, whereby said lever may be operated by the occupant of the seat or folded with the front portion of said seat when the latter is unoccupied.

In testimony whereof I have hereunto set my hand in presence of two subscribing witnesses.

ALBERT E. COLE.

Witnesses:
GEORGE TOPHAM,
NEVILLE E. BROOKES.